US008914498B2

(12) United States Patent
Aho et al.

(10) Patent No.: US 8,914,498 B2
(45) Date of Patent: *Dec. 16, 2014

(54) CALCULATING A CHECKSUM WITH INACTIVE NETWORKING COMPONENTS IN A COMPUTING SYSTEM

(75) Inventors: Michael E. Aho, Rochester, MN (US); Dong Chen, Croton on Hudson, NY (US); Noel A. Eisley, Wappingers Falls, NY (US); Thomas M. Gooding, Rochester, MN (US); Philip Heidelberger, Cortlandt Manor, NY (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/370,059

(22) Filed: Feb. 9, 2012

(65) Prior Publication Data

US 2013/0212253 A1  Aug. 15, 2013

(51) Int. Cl.
*G06F 15/173* (2006.01)

(52) U.S. Cl.
USPC .......................................... 709/224; 709/200

(58) Field of Classification Search
CPC ... G06F 11/1004; H04L 43/04; H04L 1/0061; H04L 1/00; H04L 12/26
USPC ................................................ 709/224, 200
See application file for complete search history.

(56) References Cited

U.S. PATENT DOCUMENTS

| 5,519,851 | A  | * | 5/1996  | Bender et al. ................. 710/301 |
|-----------|----|---|---------|-----------------------------------------|
| 5,987,605 | A  | * | 11/1999 | Hill et al. .......................... 713/2 |
| 6,070,182 | A  |   | 5/2000  | Rao et al.                              |
| 6,249,817 | B1 | * | 6/2001  | Nakabayashi et al. ........ 709/224     |
| 6,976,205 | B1 | * | 12/2005 | Ziai et al. ....................... 714/807 |
| 7,210,088 | B2 |   | 4/2007  | Chen et al.                             |
| 7,383,490 | B2 |   | 6/2008  | Almasi et al.                           |
| 7,715,321 | B2 |   | 5/2010  | Cardona et al.                          |
| 7,979,898 | B2 | * | 7/2011  | Zarenin et al. ..................... 726/7 |
| 8,015,237 | B2 | * | 9/2011  | Muller et al. ................. 709/201 |
| 2006/0159023 | A1 | * | 7/2006 | Hickey et al. ................. 370/241 |
| 2006/0184622 | A1 | * | 8/2006 | Ritchie et al. ................. 709/203 |

(Continued)

OTHER PUBLICATIONS

Kim et al., "Internet Protocol Engine in TCIP/IP Offloading Engine", 10th International Conference on Advanced Communication Technology (ICAT 2008), Feb. 17-20, 2008, Phoenix Park, Korea, pp. 270-275, vol. 1, Institute of Electrical and Electronics Engineers (IEEE) X-Plore Digital Library, Digital Object Identifier 10.1109/ICACT.2008.4493759, USA.

*Primary Examiner* — Anthony Mejia
(74) *Attorney, Agent, or Firm* — Biggers Kennedy Lenart Spraggins LLP

(57) ABSTRACT

Calculating a checksum utilizing inactive networking components in a computing system, including: identifying, by a checksum distribution manager, an inactive networking component, wherein the inactive networking component includes a checksum calculation engine for computing a checksum; sending, to the inactive networking component by the checksum distribution manager, metadata describing a block of data to be transmitted by an active networking component; calculating, by the inactive networking component, a checksum for the block of data; transmitting, to the checksum distribution manager from the inactive networking component, the checksum for the block of data; and sending, by the active networking component, a data communications message that includes the block of data and the checksum for the block of data.

16 Claims, 8 Drawing Sheets

(56) References Cited

U.S. PATENT DOCUMENTS

| | | | |
|---|---|---|---|
| 2007/0061439 A1* | 3/2007 | Pope et al. | 709/223 |
| 2007/0266028 A1* | 11/2007 | Muller et al. | 707/8 |
| 2008/0026853 A1* | 1/2008 | Crowder, Jr. | 463/43 |
| 2009/0248793 A1* | 10/2009 | Jacobsson et al. | 709/203 |
| 2010/0069127 A1* | 3/2010 | Fiennes | 455/574 |
| 2010/0115387 A1* | 5/2010 | Tanaka | 714/807 |
| 2010/0332479 A1* | 12/2010 | Prahlad et al. | 707/741 |
| 2012/0042324 A1* | 2/2012 | Breker et al. | 718/107 |
| 2013/0198743 A1* | 8/2013 | Kruglick | 718/1 |
| 2014/0052832 A1* | 2/2014 | Dina et al. | 709/221 |

* cited by examiner

CALCULATING A CHECKSUM WITH INACTIVE NETWORKING COMPONENTS IN A COMPUTING SYSTEM

STATEMENT REGARDING FEDERALLY SPONSORED RESEARCH OR DEVELOPMENT

This invention was made with Government support under Contract No. B579040 awarded by the Department of Energy. The Government has certain rights in this invention.

BACKGROUND OF THE INVENTION

1. Field of the Invention

The field of the invention is data processing, or, more specifically, methods, apparatus, and products for calculating a checksum with inactive networking components in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems include network adapters that enable the computing system to communicate with other computers. Some network cards have TCP/IP checksum offload engines that automatically compute the data's checksum on-the-fly. There are some drawbacks for those systems. One drawback is that the checksum is calculated prior to transmission. If a data bit flip occurs on the PCIe bus, the wrong data will get unknowingly transmitted and error detection will not occur. Another drawback is that there are configuration limits to network cards in certain modes, whereby checksum capability is disabled.

SUMMARY OF THE INVENTION

Method, apparatus, and products for calculating a checksum with inactive networking components in a computing system, including: identifying, by a checksum distribution manager, an inactive networking component, wherein the inactive networking component includes a checksum calculation engine for computing a checksum; sending, to the inactive networking component by the checksum distribution manager, metadata describing a block of data to be transmitted by an active networking component; calculating, by the inactive networking component, a checksum for the block of data; transmitting, to the checksum distribution manager from the inactive networking component, the checksum for the block of data; and sending, by the active networking component, a data communications message that includes the block of data and the checksum for the block of data.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
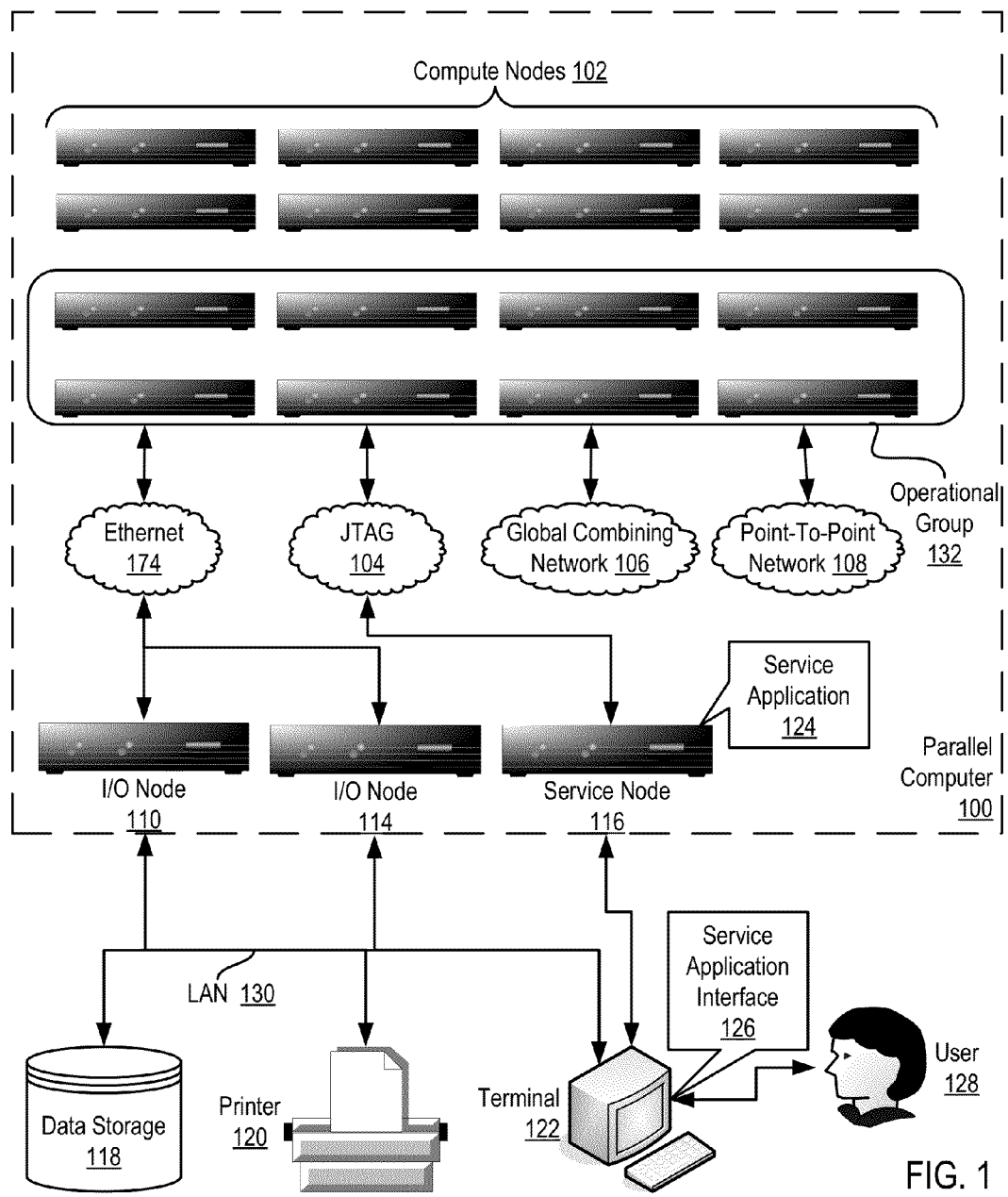
FIG. 1 illustrates an example system for calculating a checksum with inactive networking components in a computing system according to embodiments of the present invention.

Example methods, apparatus, and products for calculating a checksum with inactive networking components in a computing system in accordance with the present invention are described with reference to the accompanying drawings, beginning with FIG. 1. FIG. 1 illustrates an example system for calculating a checksum with inactive networking components in a computing system according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for calculating a checksum with inactive networking components in a computing system according to embodiments of the present invention. In the example of FIG. 1, the parallel computer (100) represents an example of a computing system in which a checksum may be calculated with inactive networking components.

The parallel computer (100) of FIG. 1 can calculate a checksum with inactive networking components by identifying, by a checksum distribution manager, an inactive networking component. The checksum distribution manager of FIG. 1 is a module of automated computing machinery that includes computer program instructions that, when executed, calculate a checksum with inactive networking components in the parallel computer (100). An inactive networking component represents a networking component, such as a network adapter, that is not currently being used to transmit or receive data over a data communications network. The inactive networking component may be 'inactive' because it is not currently connected to a data communications network, because another networking component is being used for data communications over a data communications network, because the inactive networking component is blocked from performing data communications over a data communications network as part of a security policy, and so on.

In the example of FIG. 1, the inactive networking component can include a checksum calculation engine for computing a checksum. The checksum calculation engine is a module of automated computing machinery that includes computer program instructions that, when executed, calculate a checksum for a block of data. The checksum may be computed using the block of data as input for the purpose of detecting errors that may occur during the subsequent transmission of the block of data in a data communications message.

The parallel computer (100) of FIG. 1 can further calculate a checksum with inactive networking components by sending, to the inactive networking component from the checksum distribution manager, metadata describing a block of data to be transmitted by an active networking component. In the example of FIG. 1, an active networking component is a networking component that is configured for data communications with other computing devices over a data communications network. The metadata describing a block of data to be transmitted by an active networking component may include information identifying a location in memory where the block of data is stored, information identifying the size of the block of data, information identifying data types contained in the block of data, and so on. The metadata describing a block of data to be transmitted by an active networking component may be embodied, for example, as a structured document such an extensible markup language ('XML') document, as a special purpose data structure for describing a block of data, and so on.

In the example of FIG. 1, metadata describing a block of data to be transmitted by an active networking component may be sent from the checksum distribution manager to the inactive networking component over a data communications bus. For example, the computer program instructions that comprise the checksum distribution manager may be executing on a computer processor connected to a data communications bus, such as an expansion bus, for coupling the computer processor to expansion adapters. In such an example, the inactive networking component may be embodied as a network adapter such as peripheral component interconnect express ('PCIe') expansion card. In such an example, the computer processor that is executing the computer program instructions that comprise the checksum distribution manager may communicate with the inactive networking component embodied as a PCIe expansion card over an expansion bus.

The parallel computer (100) of FIG. 1 can further calculate a checksum with inactive networking components by calculating, by the inactive networking component, a checksum for the block of data. Calculating a checksum for the block of data may be carried out by the checksum calculation engine of the inactive networking component. The checksum calculation engine of the inactive networking component may calculate the checksum for the block of data by applying a checksum function or checksum algorithm to the block of data. Applying the checksum function or checksum algorithm to the block of data will yield a value that will be taken as the checksum for the block of data.

The parallel computer (100) of FIG. 1 can further calculate a checksum with inactive networking components by transmitting, to the checksum distribution manager from the inactive networking component, the checksum for the block of data. Transmitting the checksum for the block of data may be carried out by transmitting the checksum for the block of data from the inactive networking component to the checksum distribution manager over a data communications bus as described below.

The parallel computer (100) of FIG. 1 can further calculate a checksum with inactive networking components by sending, by the active networking component, a data communications message that includes the block of data and the checksum for the block of data. Sending a data communications message that includes the block of data and the checksum for the block of data may include sending one or more packets of data that include some portion of the block of data and the checksum to a recipient over a data communications network that the active networking component is configured to communicate over. The one or more packets of data that include some portion of the block of data and the checksum may conform with a data communications protocol such as, for example, TCP/IP. Furthermore, the one or more packets of data that include some portion of the block of data and the checksum may be sent over any of the networks described below with reference to FIGS. 2-5, such as the torus network, global combining network, and so on.

Calculating a checksum with inactive networking components is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
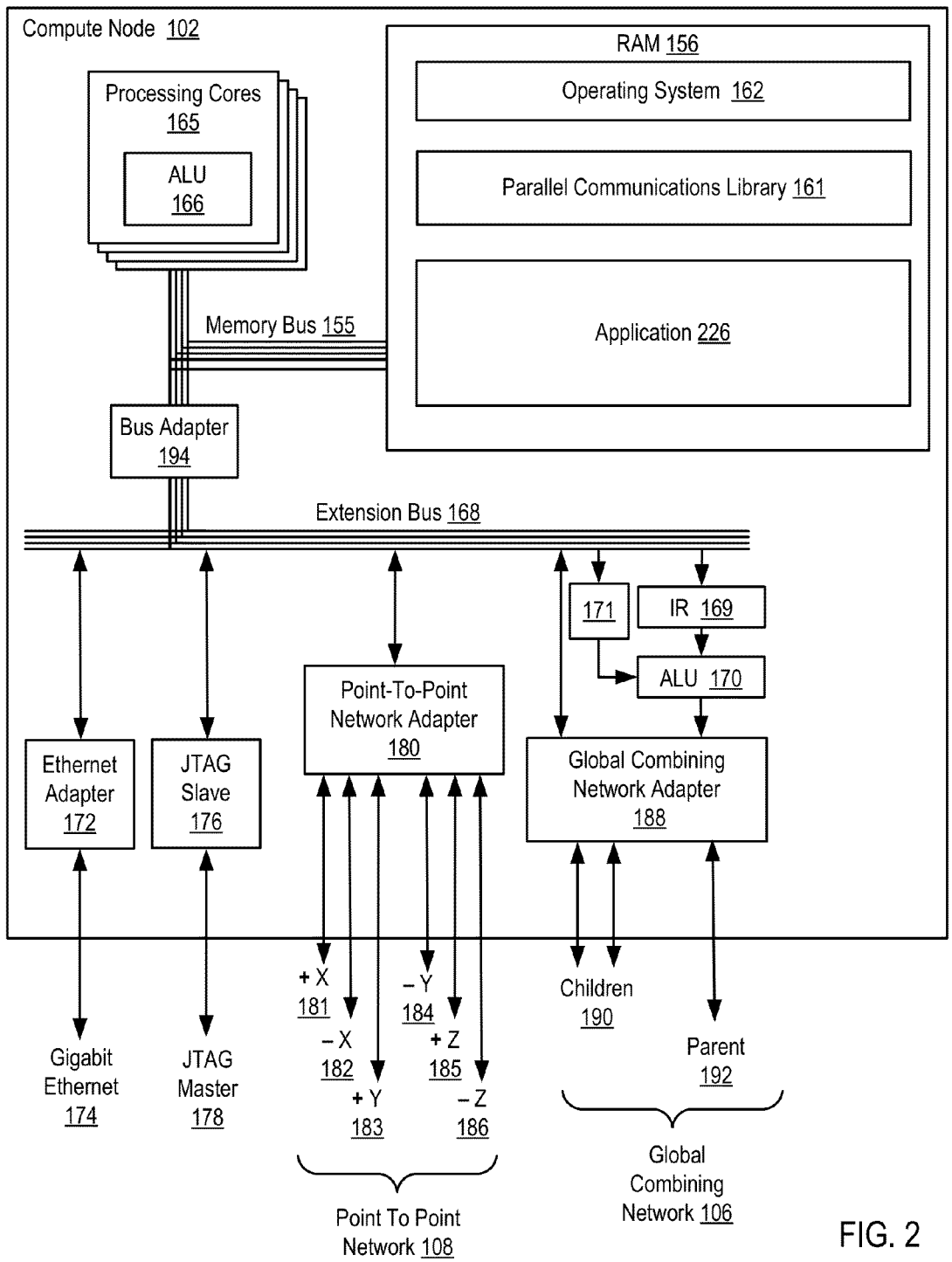
FIG. 2 sets forth a block diagram of an example compute node useful in a parallel computer capable of calculating a checksum with inactive networking components in a computing system according to embodiments of the present invention.

For further explanation, FIG. 2 sets forth a block diagram of an example compute node (102) useful in a parallel computer capable of calculating a checksum with inactive networking components in a computing system according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an application (226). The application (226) in the example of FIG. 2 may be configured as one instance of a parallel application with other instances executing amongst a plurality of compute nodes organized into an operational group. The application (226) in the example of FIG. 2 is configured for calculating a checksum with inactive networking components in a computing system in accordance with embodiments of the present invention. The application (226) in the example of FIG. 2 can calculate a checksum with inactive networking components in accordance with embodiments of the present invention by carrying out the steps of: identifying, by a checksum distribution manager, an inactive networking component, wherein the inactive networking component includes a checksum calculation engine for computing a checksum; sending, to the inactive networking component from the checksum distribution manager, metadata describing a block of data to be transmitted by an active networking component; calculating, by the inactive networking component, a checksum for the block of data; transmitting, to the checksum distribution manager from the inactive networking component, the checksum for the block of data; and sending, by the active networking component, a data communications message that includes the block of data and the checksum for the block of data.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of configuring compute nodes in a parallel computer using RDMA include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of calculating a checksum with inactive networking components in a computing system according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
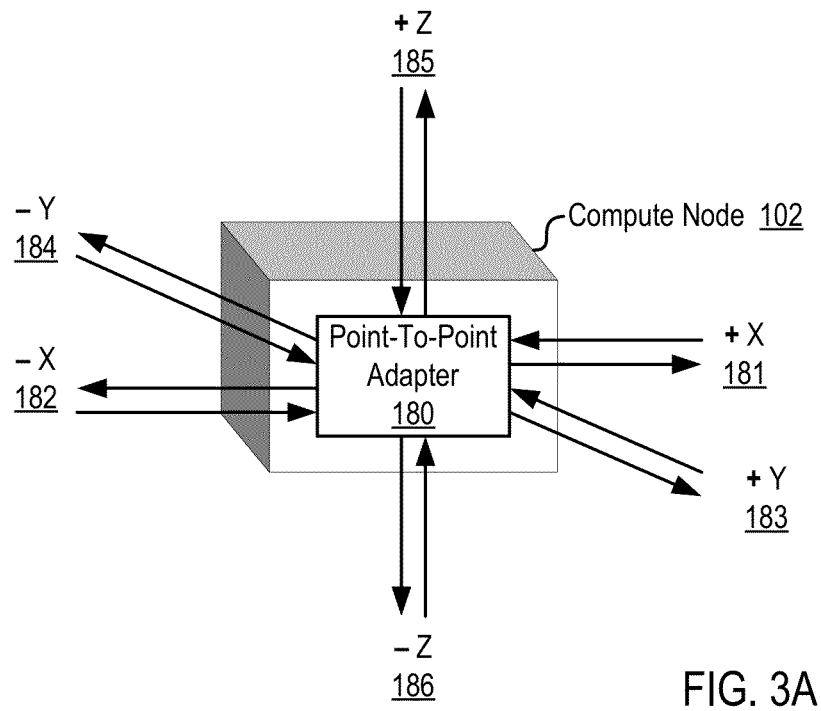
FIG. 3A sets forth a block diagram of an example Point-To-Point Adapter useful in systems capable of calculating a checksum with inactive networking components in a computing system according to embodiments of the present invention.

For further explanation, FIG. 3A sets forth a block diagram of an example Point-To-Point Adapter (180) useful in systems capable of calculating a checksum with inactive networking components in a computing system according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
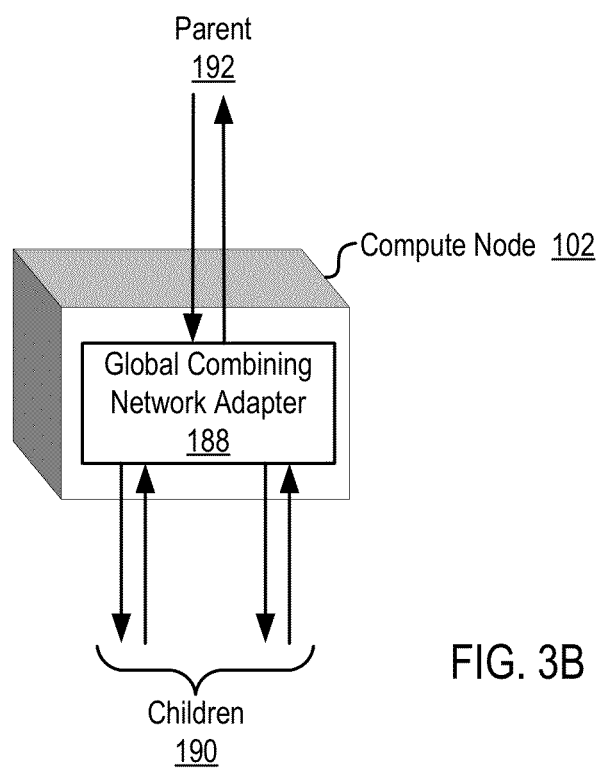
FIG. 3B sets forth a block diagram of an example Global Combining Network Adapter useful in systems capable of calculating a checksum with inactive networking components in a computing system according to embodiments of the present invention.

For further explanation, FIG. 3B sets forth a block diagram of an example Global Combining Network Adapter (188) useful in systems capable of calculating a checksum with inactive networking components in a computing system according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
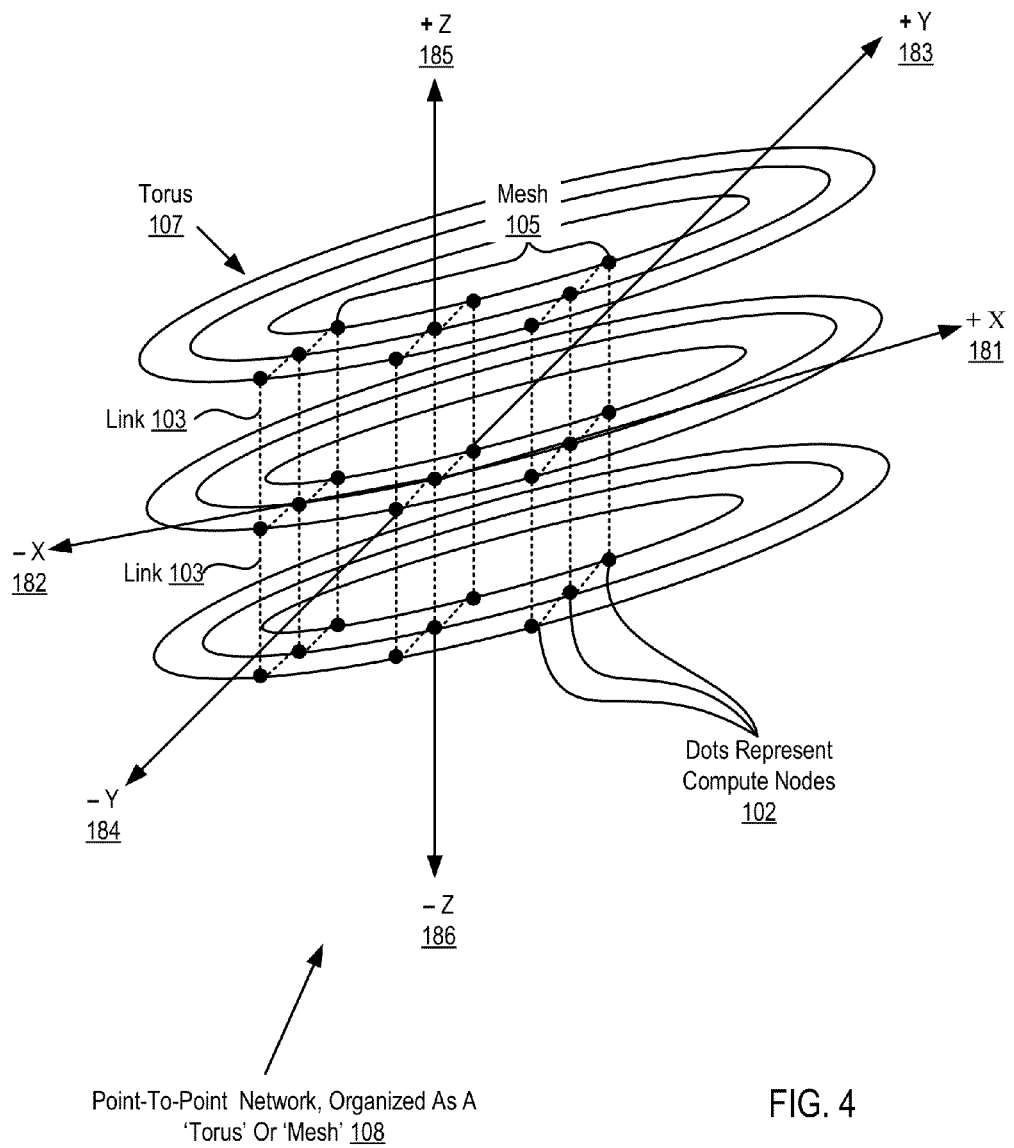
FIG. 4 sets forth a line drawing illustrating an example data communications network optimized for point-to-point operations useful in systems capable of calculating a checksum with inactive networking components in a computing system according to embodiments of the present invention.

For further explanation, FIG. 4 sets forth a line drawing illustrating an example data communications network (108) optimized for point-to-point operations useful in systems capable of calculating a checksum with inactive networking components in a computing system according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in calculating a checksum with inactive networking components in a computing system in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in calculating a checksum with inactive networking components in a computing system in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
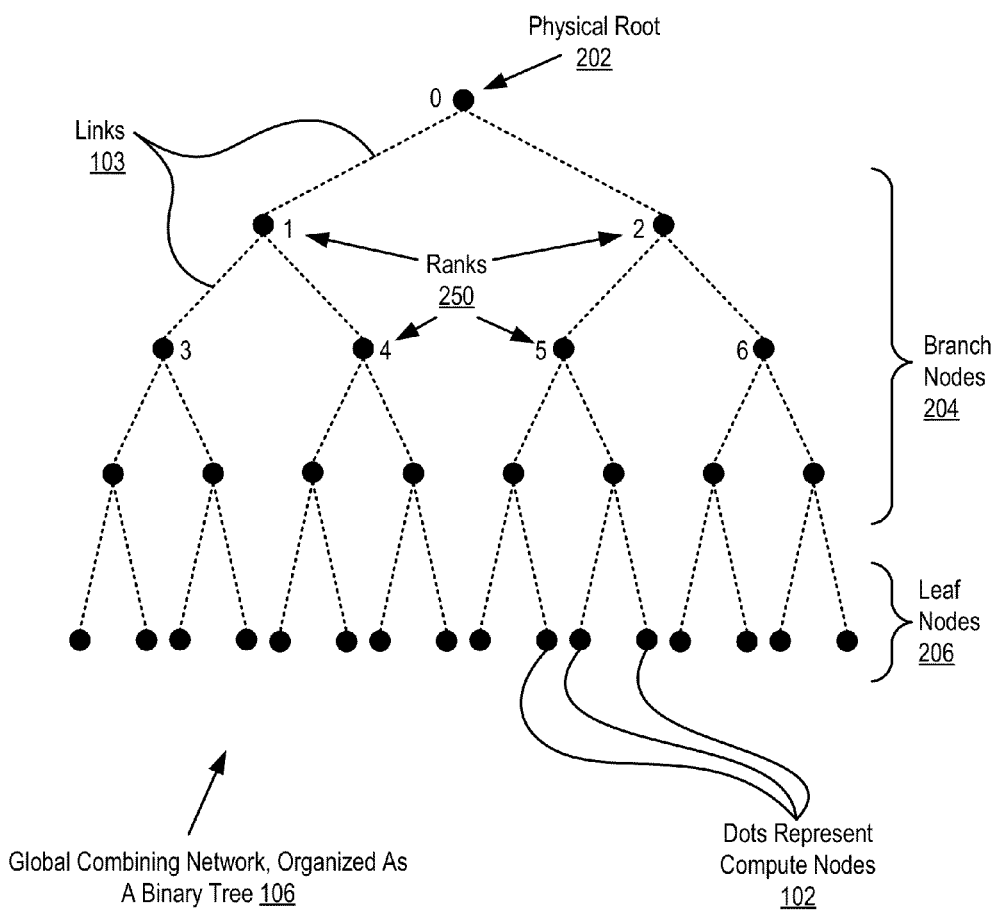
FIG. 5 sets forth a line drawing illustrating an example global combining network useful in systems capable of calculating a checksum with inactive networking components in a computing system according to embodiments of the present invention.

For further explanation, FIG. 5 sets forth a line drawing illustrating an example global combining network (106) useful in systems capable of calculating a checksum with inactive networking components in a computing system according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in calculating a checksum with inactive networking components in a computing system in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
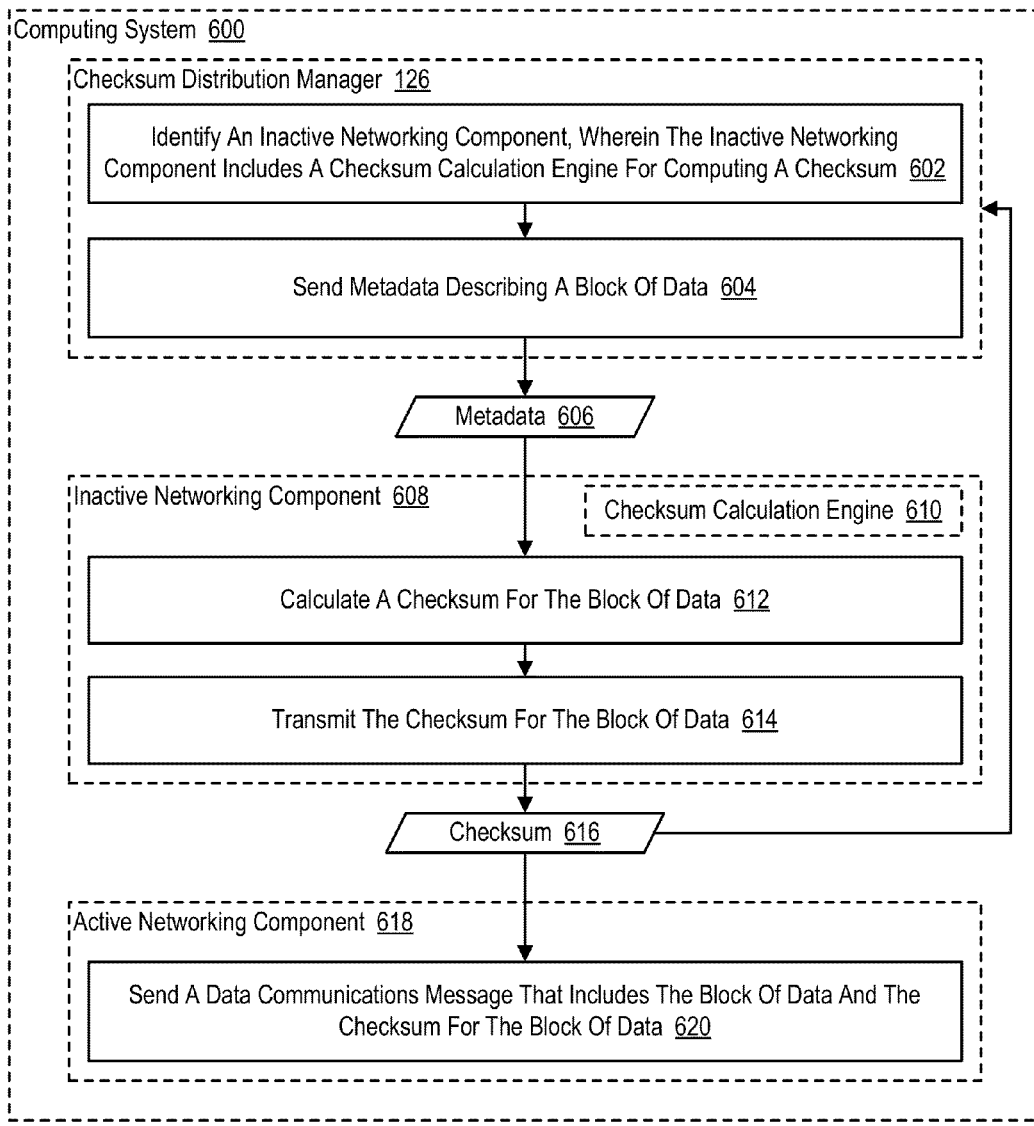
FIG. 6 sets forth a flow chart illustrating an example method for calculating a checksum with inactive networking components in a computing system according to embodiments of the present invention.

For further explanation, FIG. 6 sets forth a flow chart illustrating an example method for calculating a checksum with inactive networking components in a computing system (600) according to embodiments of the present invention. The example method of FIG. 6 includes identifying (602), by a checksum distribution manager (126), an inactive networking component (608). The checksum distribution manager (126) of FIG. 6 is a module of automated computing machinery that includes computer program instructions that, when executed, calculate a checksum with inactive networking components in a computing system (600). In the example method of FIG. 6, an inactive networking component (608) represents a networking component, such as a network adapter, that is not currently being used to transmit or receive data over a data communications network. In the example method of FIG. 6, the inactive networking component (608) may be 'inactive' because it is not currently connected to a data communications network, because another networking component is being used for data communications over a data communications network, because the inactive networking component (608) is blocked from performing data communications over a data communications network as part of a security policy, and so on.

In the example method of FIG. 6, the inactive networking component (608) includes a checksum calculation engine (610) for computing a checksum. The checksum calculation engine (610) of FIG. 6 is a module of automated computing machinery that includes computer program instructions that, when executed, calculate a checksum (616) for a block of data. In the example method of FIG. 6, the checksum (616) is computed using the block of data as input for the purpose of detecting errors that may occur during the subsequent transmission of the block of data in a data communications message.

The example method of FIG. 6 also includes sending (604), to the inactive networking component (608) from the checksum distribution manager (126), metadata (606) describing a block of data. The active networking component (618) of FIG. 6 is a networking component that is configured for data communications with one or more computing devices over a data communications network. In the example method of FIG. 6, metadata (606) describing a block of data may include information identifying a location in memory where the block of data is stored, information identifying the size of the block of data, information identifying data types contained in the block of data, and so on. The metadata (606) describing a block of data may be embodied, for example, as a structured document such an XML document, as a special purpose data structure for describing a block of data, and so on.

In the example method of FIG. 6, the block of data may be data to be transmitted by the active networking component (618). That is, the block of data may be outbound data in the sense that the active networking component (618) is sending the block of data to another networking component in a data communications network. Alternatively, the block of data may be data that is received by the active networking component (618). That is, the block of data may be inbound data in the sense that the active networking component (618) is receiving the block of data to another networking component in a data communications network. As such, the inactive networking component (608) may be utilized to calculate checksums for inbound and outbound data communications.

In the example method of FIG. 6, metadata (606) describing a block of data to be transmitted by an active networking component (618) may be sent (604) from the checksum distribution manager (126) to the inactive networking component (608) over a data communications bus. For example, the computer program instructions that comprise the checksum distribution manager (126) may be executing on a computer processor connected to a data communications bus, such as an expansion bus, for coupling the computer processor to expansion adapters. In such an example, the inactive networking component (608) may be embodied as a network adapter such as PCIe expansion card. In such an example, the computer processor that is executing the computer program instructions that comprise the checksum distribution manager (126) may communicate with the inactive networking component (608) embodied as a PCIe expansion card over an expansion bus.

The example method of FIG. 6 also includes calculating (612), by the inactive networking component (608), a checksum (616) for the block of data. In the example method of FIG. 6, calculating (612) a checksum (616) for the block of data may be carried out by the checksum calculation engine (610) of the inactive networking component (608). The checksum calculation engine (610) of the inactive networking component (608) may calculate (612) the checksum (616) for the block of data by applying a checksum function or checksum algorithm to the block of data. Applying the checksum function or checksum algorithm to the block of data will yield a value that will be taken as the checksum (616) for the block of data.

The example method of FIG. 6 also includes transmitting (614), to the checksum distribution manager (126) from the inactive networking component (608), the checksum (616) for the block of data. In the example method of FIG. 6, transmitting (614) the checksum (616) for the block of data may be carried out by transmitting the checksum (616) for the block of data from the inactive networking component (608) to the checksum distribution manager (126) over a data communications bus as described above.

The example method of FIG. 6 also includes sending (620), by the active networking component (618), a data communications message that includes the block of data and the checksum (616) for the block of data. In the example method of FIG. 6, sending (620) a data communications message that includes the block of data and the checksum (616) for the block of data may include sending one or more packets of data that include some portion of the block of data and the checksum (616) to a recipient over a data communications network that the active networking component (618) is configured to communicate over. The one or more packets of data that include some portion of the block of data and the checksum (616) may conform with a data communications protocol such as, for example, TCP/IP. Furthermore, the one or more packets of data that include some portion of the block of data and the checksum (616) may be sent (620) over any of the networks described above with reference to FIGS. 1-5, such as the torus network, global combining network, and so on.

Figure 7:
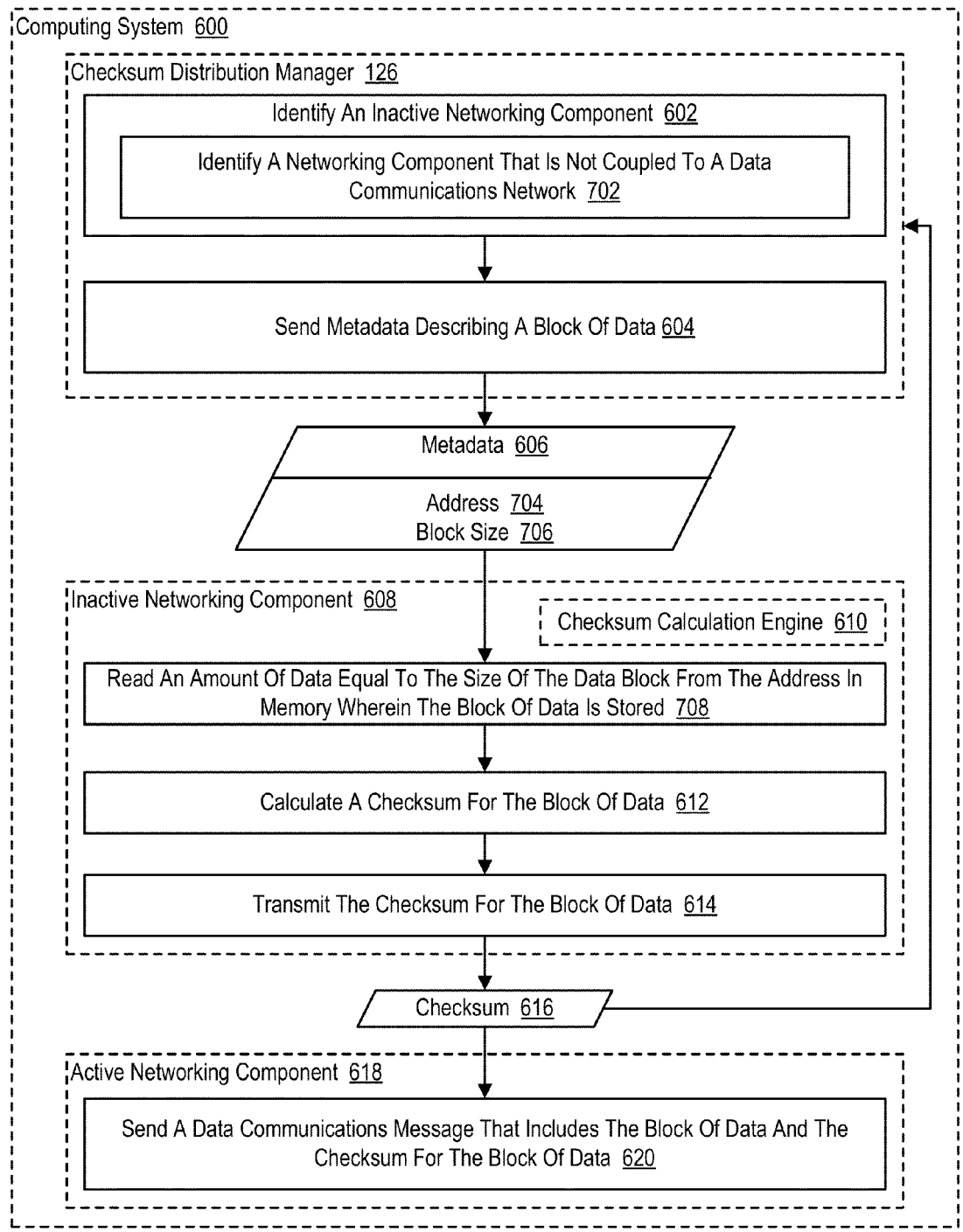
FIG. 7 sets forth a flow chart illustrating a further example method for calculating a checksum with inactive networking components in a computing system according to embodiments of the present invention.

For further explanation, FIG. 7 sets forth a flow chart illustrating an example method for calculating a checksum with inactive networking components in a computing system (600) according to embodiments of the present invention. The example method of FIG. 7 is similar to the example method of FIG. 6, as it also includes identifying (602) an inactive networking component (608), sending (604) metadata (606) describing a block of data, calculating (612) a checksum (616) for the block of data, transmitting (614) the checksum (616) for the block of data, and sending (620) a data communications message that includes the block of data and the checksum (616) for the block of data.

In the example method of FIG. 7, identifying (602) an inactive networking component (608) includes identifying (702) a networking component that is not coupled to a data communications network. In the example method of FIG. 7, a computing system may include a plurality of networking components, such as network adapters of different or redundant types, for coupling the computing system to one or more data communications networks. In some embodiments, a subset of the plurality of networking components may not be coupled to a data communications for a variety of reasons. For example, a data communications network of the type that a particular networking component connects to may be untrusted or otherwise unavailable. In addition, a redundant networking component in the computing system may already be coupled to a data communications network that the networking component is designed to connect to. As such, a particular networking component in the computing system may not be connected to data communications network at all. In such an example, identifying (702) a networking component that is not coupled to a data communications network may be carried out, for example, by examining a table that identifies all network connections for a particular computing system and identifying those networking components that are not part of any network connections.

In the example method of FIG. 7, the metadata (606) describing the block of data can include an address (704) in memory wherein the block of data is stored and information describing the size (706) of the data block. In the example method of FIG. 7, the address (704) in memory where the block of data is stored may be embodied, for example, as a virtual address that is translated through the use of a translation table, as a real address, and so on. The information describing the size (706) of the data block may be specified, for example, as a byte size, as a count that identifies the number of data elements of a particular type that are included in the data block, and so on.

The example method of FIG. 7 also includes reading (708), by the inactive networking component (608), an amount of data equal to the size (706) of the data block from the address (704) in memory where the block of data is stored. In the example method of FIG. 7, the inactive networking component (608) may read (708) the data block from the address (704) in memory where the block of data is stored through the use of direct memory access techniques in which the inactive networking component (608) assumes control of a system bus to access memory directly. Assuming that the data block is stored in a contiguous portion of memory, the inactive networking component (608) may begin reading data from the address (704) in memory where the block of data is stored and may continue reading data from memory until an amount of data that is equal in size to the size (706) of the data block has been read by the inactive networking component (608).

Figure 8:
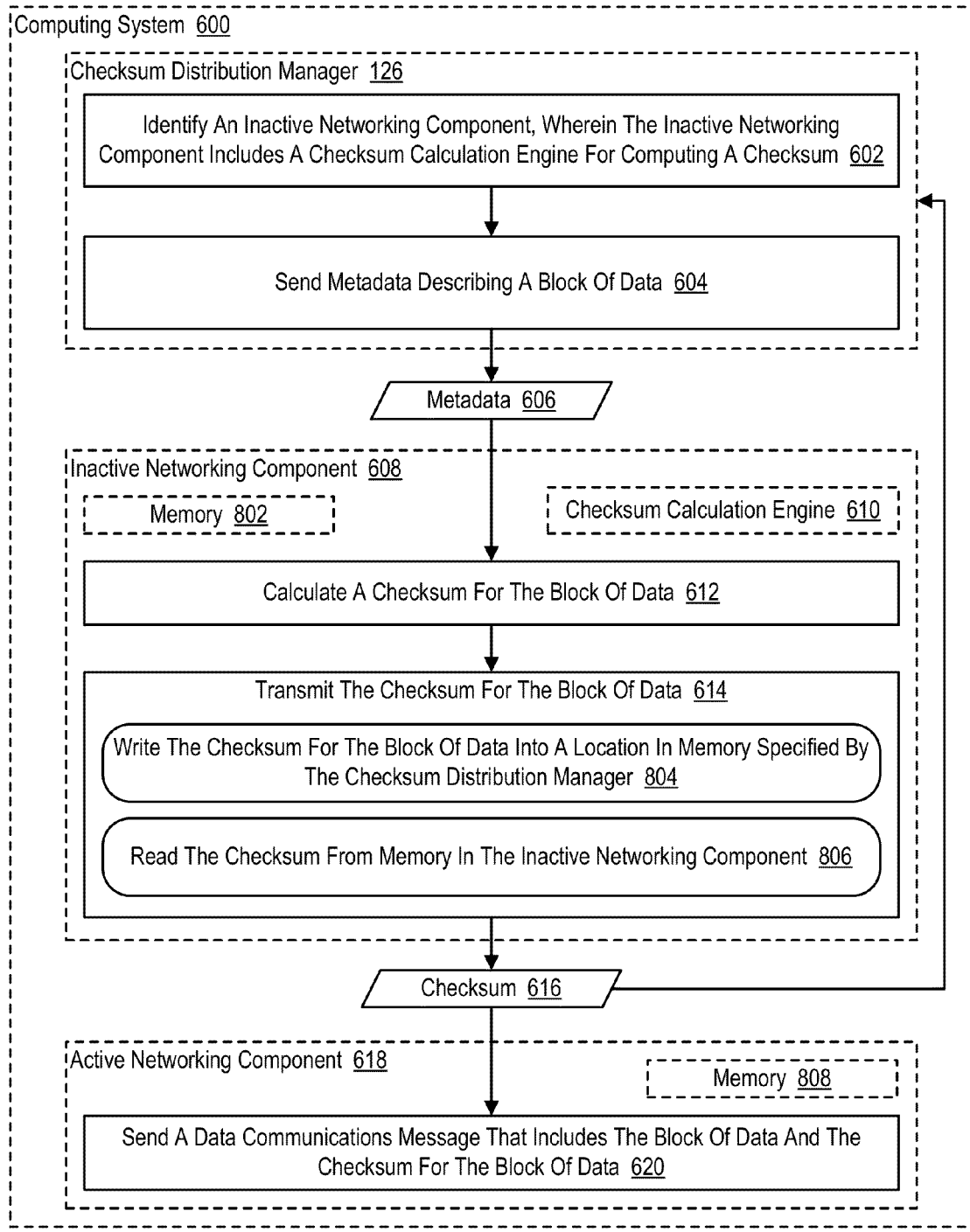
FIG. 8 sets forth a flow chart illustrating a further example method for calculating a checksum with inactive networking components in a computing system according to embodiments of the present invention.

For further explanation, FIG. 8 sets forth a flow chart illustrating an example method for calculating a checksum with inactive networking components in a computing system (600) according to embodiments of the present invention. The example method of FIG. 8 is similar to the example method of FIG. 6, as it also includes identifying (602) an inactive networking component (608), sending (604) metadata (606) describing a block of data, calculating (612) a checksum (616) for the block of data, transmitting (614) the checksum (616) for the block of data, and sending (620) a data communications message that includes the block of data and the checksum (616) for the block of data.

In the example method of FIG. 8, transmitting (614) the checksum (616) for the block of data can include writing (804), by the inactive networking component (608), the checksum (616) for the block of data into a location in memory specified by the checksum distribution manager (126). In the example method of FIG. 8, the inactive networking component (608) may write (804) the checksum (616) for the block of data into a location in memory specified by the checksum distribution manager (126) through the use of direct memory access techniques in which the inactive networking component (608) assumes control of a system bus to access memory directly. In such an example, the checksum distribution manager (126) may include a return memory address in a request to calculate a checksum that is issued to the inactive networking component (608). After the inactive networking component (608) has calculated the checksum (616), the inactive networking component (608) may subsequently write the checksum (616) to the return memory address specified in the original request to calculate the checksum (616).

In the example method of FIG. 8, transmitting (614) the checksum (616) for the block of data can alternatively include reading (806), by the checksum distribution manager (126), the checksum (616) from memory (802) in the inactive networking component (608). In the example method of FIG. 8, after the inactive networking component (608) has calculated the checksum (616), the inactive networking component (608) may simply send a message to the checksum distribution manager (126) indicating that the inactive networking component (608) has calculated the checksum (616) that includes an address in memory (802) of the inactive networking component (608) at which the checksum (616) is stored. In such an example, the checksum distribution manager (126) may read (806) the checksum (616) from the address in memory (802) of the inactive networking component (608) at which the checksum (616) is stored.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for calculating a checksum for a block of data to be transmitted over a data communications network, the apparatus comprising a computer processor, a computer memory operatively coupled to the computer processor, the computer memory having disposed within it computer program instructions that, when executed by the computer processor, causes the apparatus to carry out the steps of:
   identifying, by a checksum distribution manager, an inactive networking component that will not be utilized to transmit any portion of the block of data over the data communications network, wherein the inactive networking component includes a checksum calculation engine for computing a checksum, the inactive networking component comprising a network adapter;
   sending, to the inactive networking component from the checksum distribution manager, metadata describing a block of data;
   calculating, by the inactive networking component, a checksum for the block of data; and
   transmitting, to the checksum distribution manager from the inactive networking component, the checksum for the block of data.

2. The apparatus of claim 1 wherein the block of data is data to be transmitted by an active networking component, the computer memory further having disposed within it computer program instructions that, when executed by the computer processor, cause the apparatus to carry out the step of:
   sending, by the active networking component, a data communications message that includes the block of data and the checksum for the block of data.

3. The apparatus of claim 1 wherein the block of data is data that is received by an active networking component.

4. The apparatus of claim 1 wherein identifying an inactive networking component includes a identifying a networking component that is not coupled to a data communications network.

5. The apparatus of claim 1 wherein the metadata describing the block of data includes an address in memory wherein the block of data is stored and information describing the size of the data block.

6. The apparatus of claim 5 further comprising computer program instructions that, when executed by the computer processor, causes the apparatus to carry out the step of reading, by the inactive networking component, an amount of data equal to the size of the data block from the address in memory where the block of data is stored.

7. The apparatus of claim 1 wherein transmitting the checksum for the block of data further comprises writing, by the inactive networking component, the checksum for the block of data into a location in memory specified by the checksum distribution manager.

8. The apparatus of claim 1 wherein transmitting the checksum for the block of data further comprises further comprises reading, by the checksum distribution manager, the checksum from memory in the inactive networking component.

9. A computer program product for calculating a checksum for a block of data to be transmitted over a data communications network, the computer program product comprising a non-transitory computer readable medium that includes computer program instructions that, when executed, cause a computer to carry out the steps of:
   identifying, by a checksum distribution manager, an inactive networking component that will not be utilized to transmit any portion of the block of data over the data communications network, wherein the inactive networking component includes a checksum calculation engine for computing a checksum, the inactive networking component comprising a network adapter;
   sending, to the inactive networking component from the checksum distribution manager, metadata describing a block of data;
   calculating, by the inactive networking component, a checksum for the block of data; and
   transmitting, to the checksum distribution manager from the inactive networking component, the checksum for the block of data.

10. The computer program product of claim 9 wherein the block of data is data to be transmitted by an active networking component, the computer program product further comprising computer program instructions that, when executed, cause the computer to carry out the step of:
   sending, by the active networking component, a data communications message that includes the block of data and the checksum for the block of data.

11. The computer program product of claim 9 wherein the block of data is data that is received by an active networking component.

12. The computer program product of claim 9 wherein identifying an inactive networking component includes a identifying a networking component that is not coupled to a data communications network.

13. The computer program product of claim 9 wherein the metadata describing the block of data includes an address in memory wherein the block of data is stored and information describing the size of the data block.

14. The computer program product of claim 13 further comprising computer program instructions that, when executed, cause the computer to carry out the step of reading, by the inactive networking component, an amount of data equal to the size of the data block from the address in memory where the block of data is stored.

15. The computer program product of claim 9 wherein transmitting the checksum for the block of data further comprises writing, by the inactive networking component, the checksum for the block of data into a location in memory specified by the checksum distribution manager.

16. The computer program product of claim 9 wherein transmitting the checksum for the block of data further comprises further comprises reading, by the checksum distribution manager, the checksum from memory in the inactive networking component.

\* \* \* \* \*